United States Patent [19]

Pierson

[11] Patent Number: 5,130,021
[45] Date of Patent: Jul. 14, 1992

[54] FILTRATION APPARATUS

[75] Inventor: Henri G. W. Pierson, Tenerife, Spain

[73] Assignee: D & C Limited, Monrovia, Liberia

[21] Appl. No.: 550,943

[22] Filed: Jul. 11, 1990

[30] Foreign Application Priority Data

Jul. 26, 1989 [GB] United Kingdom ................ 8917073

[51] Int. Cl.$^5$ ............................................. B01D 35/00
[52] U.S. Cl. ................................. 210/399; 210/497.01
[58] Field of Search ............... 210/358, 388, 399, 406, 210/416.1, 398, 497.01; 209/269, 275, 365.1, 279; 366/239

[56] References Cited

U.S. PATENT DOCUMENTS

| | | | |
|---|---|---|---|
| 653,631 | 7/1900 | Wallace | 210/358 |
| 891,048 | 6/1908 | Donovan | 210/399 |
| 1,017,518 | 2/1912 | Edgerton | 210/399 |
| 1,110,790 | 9/1914 | Isherwood | 210/358 |
| 1,215,565 | 2/1917 | Malm | 210/399 |
| 4,049,386 | 9/1977 | Gillain | 210/358 |

Primary Examiner—W. Gary Jones
Assistant Examiner—Matthew O. Savage
Attorney, Agent, or Firm—Dennison, Meserole, Pollack & Scheiner

[57] ABSTRACT

Batch filtration is carried out within a rockable/rotatable housing, suspension to be filtered being fed in via ports in the upper region onto a curved filter fixed within the housing, and filtrate draining from below, via outlets to which vacuum may be applied. The housing is preferably cylindrical and may be mounted upon rollers or wheels so that rocking or rotating can be effected by belts or chains attached between the housing and a linearly reciprocable member, or by a rotary gear or friction drive wheel acting on the housing circumference, or by rack and pinion means, or a variety of other means. Washing of filter cake, reslurrying, drying by hot gases, and pressurization can all take place "in situ" whilst rocking continues, and discharge of cake is effected via the same ports as for inlet by turning the housing over.

9 Claims, 7 Drawing Sheets

FILTRATION APPARATUS

BACKGROUND ART

In batch orientated manufacturing processes so called "nutsch" filters or "box" filters or "tile" filters are still widely used. These filters all comprise a circular or more commonly a square or rectangular box having a drainage floor which may or may not be fitted with a filter cloth and side walls to retain the suspension to be filtered. The drainage floor is connected to a suction device such as a vacuum pump or centrifugal pump. After filtration and/or cake washing the filters are manually dug out.

Apart from the high labour requirement and frequent damage to any filter cloth, a great disadvantage of these filters is that the filter cake tends to suffer badly from cracking, resulting from cake shrinkage upon drying.

Alternative mechanically operated machines exist, but are of such a complexity and cost that in many cases the advantages of labour saving is not compensation enough for the capital investment.

OBJECTS OF THE INVENTION

It is an object of the present invention to provide a simple, reliable and inexpensive machine which removes most if not all the labour element, offers the possibility of filtering under vacuum or under pressure, enables the formation of a cake which in most cases will be free of cracks and enables a reslurry operation as well as a drying operation, should this be an advantage to the process

SUMMARY OF THE INVENTION

According to the invention filtration apparatus is proposed which comprises curved filter means mounted within a rotatable or rockable housing and overlying an outlet of the housing through which filtrate can drain, the housing also having inlet means whereby material to be filtered can be supplied to the filter means, and means for rotating or rocking the housing alternately in opposite directions.

For vacuum assisted filtration a vacuum source can be connected to the outlet(s) of the housing.

For pressure-assisted filtration (with or without vacuum application), the housing is preferably substantially closed so that a source of pressure medium, such as compressed air, can be connected to the housing, and be effective to exert pressure on the material being filtered and the resulting cake.

In a preferred embodiment of the apparatus of the invention the housing is cylindrical and the filter means is part-cylindrical (i.e. semi-circular in cross-section).

In one embodiment the housing is advantageously mounted upon rollers, wheels, or other rotary bearings, to facilitate its own rotary or rocking motion.

Rotary motion of the housing may advantageously be accomplished by means of belts or chains. These may be entrained around and attached to the housing and to another member which is movable on a rectilinear path by means of a piston or ram of a hydraulic or pneumatic cylinder. However, rotary, or rocking motion can, within the scope of the invention, be achieved by numerous other mechanical arrangements, such as swinging of the housing by pivotal arms, or by rotary gears acting directly on the housing circumference or on a shaft upon which the housing is mounted, or by rack and pinion means.

Further features and advantages of the invention will emerge from the ensuing description of specific embodiments of apparatus in accordance with the invention, with reference to the accompanying drawings.

DETAILED DESCRIPTION OF ILLUSTRATED EMBODIMENTS

Figure 5:
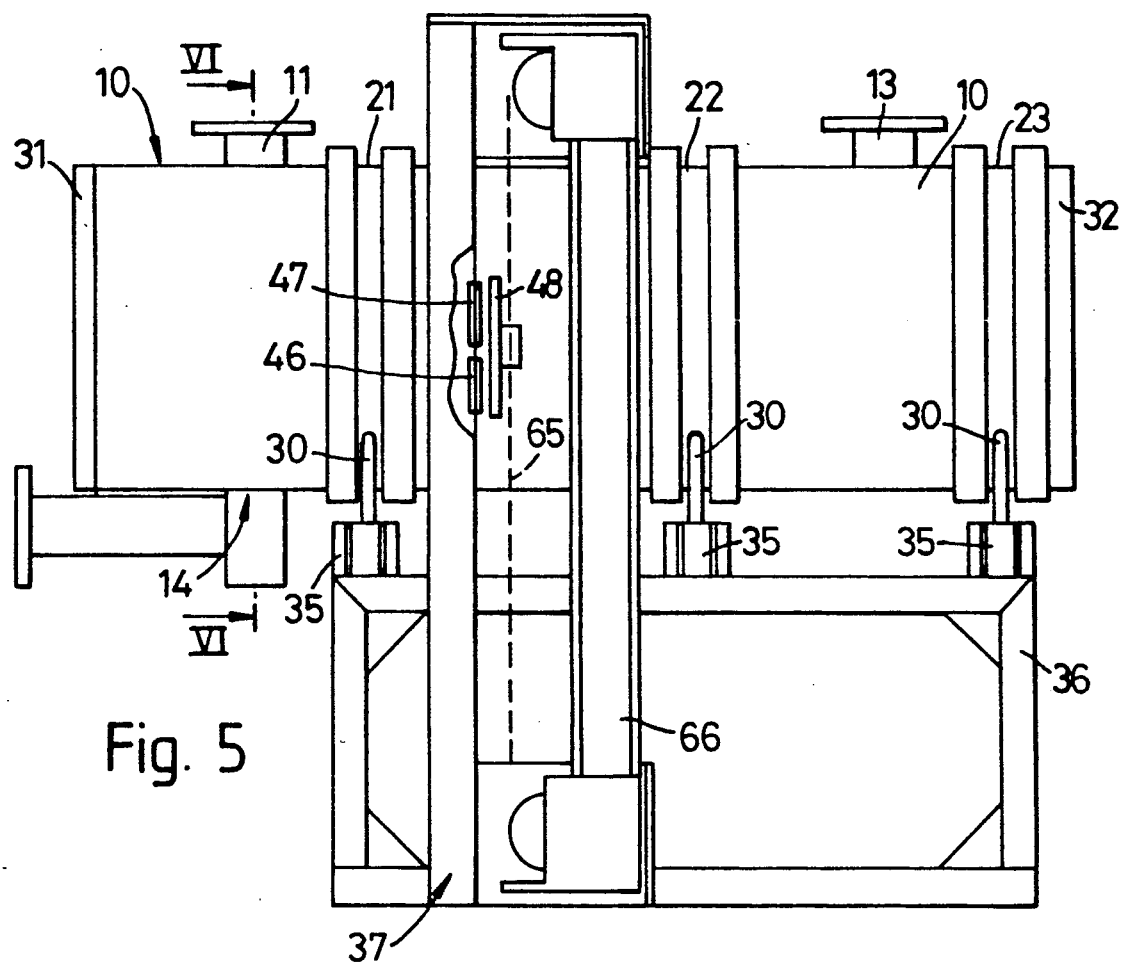
FIG. 5 is a side view of the apparatus shown in FIG. 1.
Figure 6:
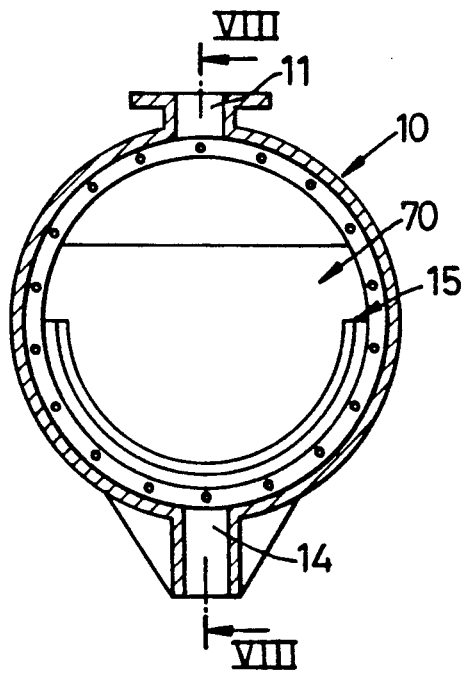
FIG. 6 is a transverse cross-section of the housing along the line VI—VI in FIG. 5.
Figure 9:
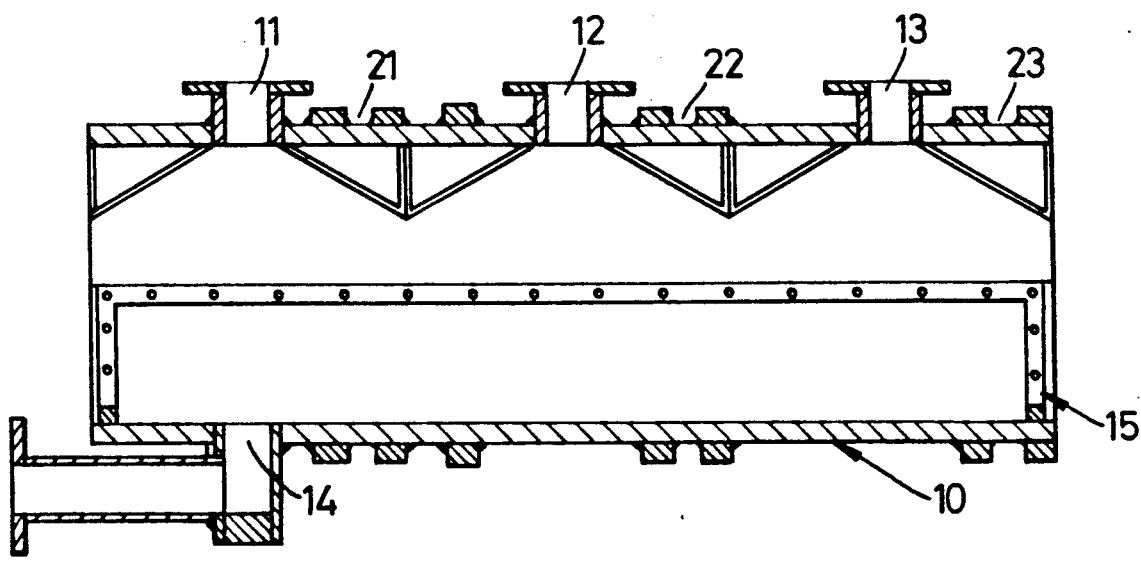
FIG. 9 is a longitudinal cross-section of the housing along the line VIII—VIII in FIG. 6.

The apparatus illustrated in FIGS. 1 to 9 comprises a cylindrical filtration housing 10 having a generally horizontal axis and also having a number of inlet/outlet ports in a row along its top (three are shown 11, 12, 13) and a single outlet port 14 at its bottom below curved filtration means of approximately semi-circular cross-sectional form, which is designated generally by reference numeral 15 (FIGS. 6 and 9).

Figure 7:
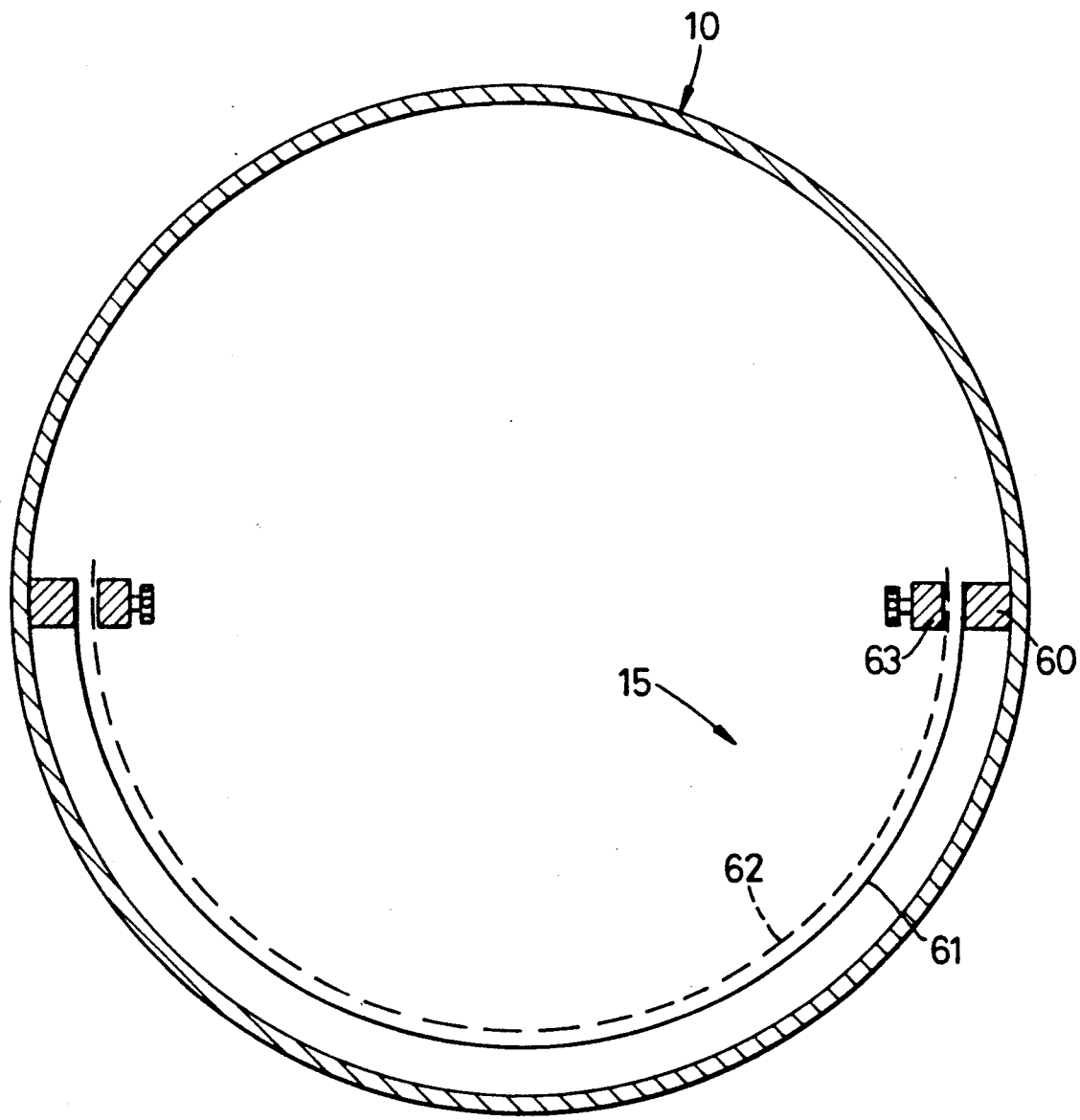
FIG. 7 is an enlarged cross-section, compared to FIG. 6, to show more detail of the filter means.
Figure 8:
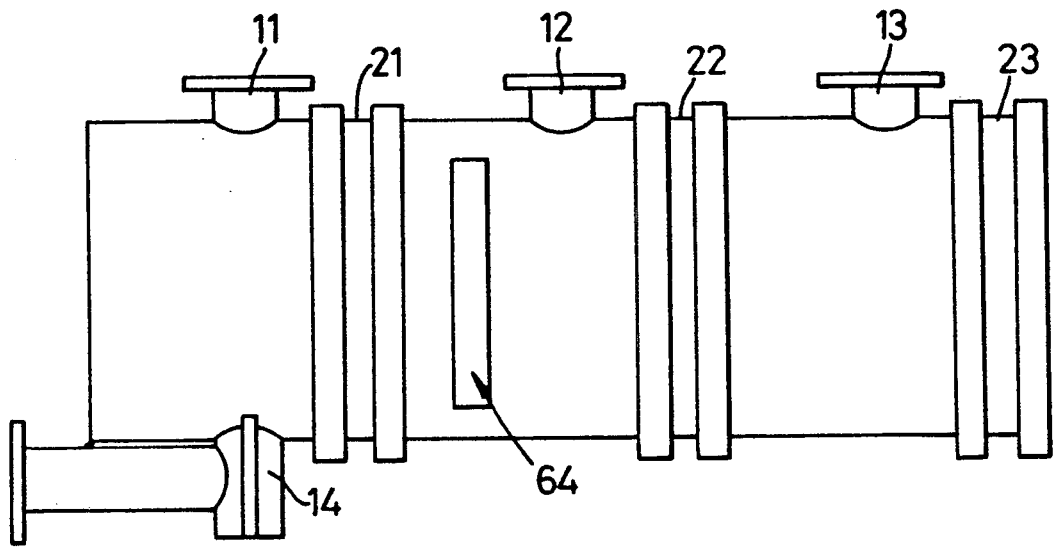
FIG. 8 is a side view of the housing alone.

The filtration means 15 comprises a framework 60, a drainage grid 61, a filter cloth 62 and a fixing frame 63 (see FIG. 7). The framework 60 is welded to the internal surface of the housing 10 and consists of semicircular end members whose ends are joined by elongate members extending axially of the housing 10 at opposite sides thereof. The drainage grid is of semicircular form and is releasably mounted on the framework 60. It supports the overlying filter cloth 62, and the latter is held down by the fixing frame 63 which is clamped by bolts to the fixed framework 60.

Figure 1:
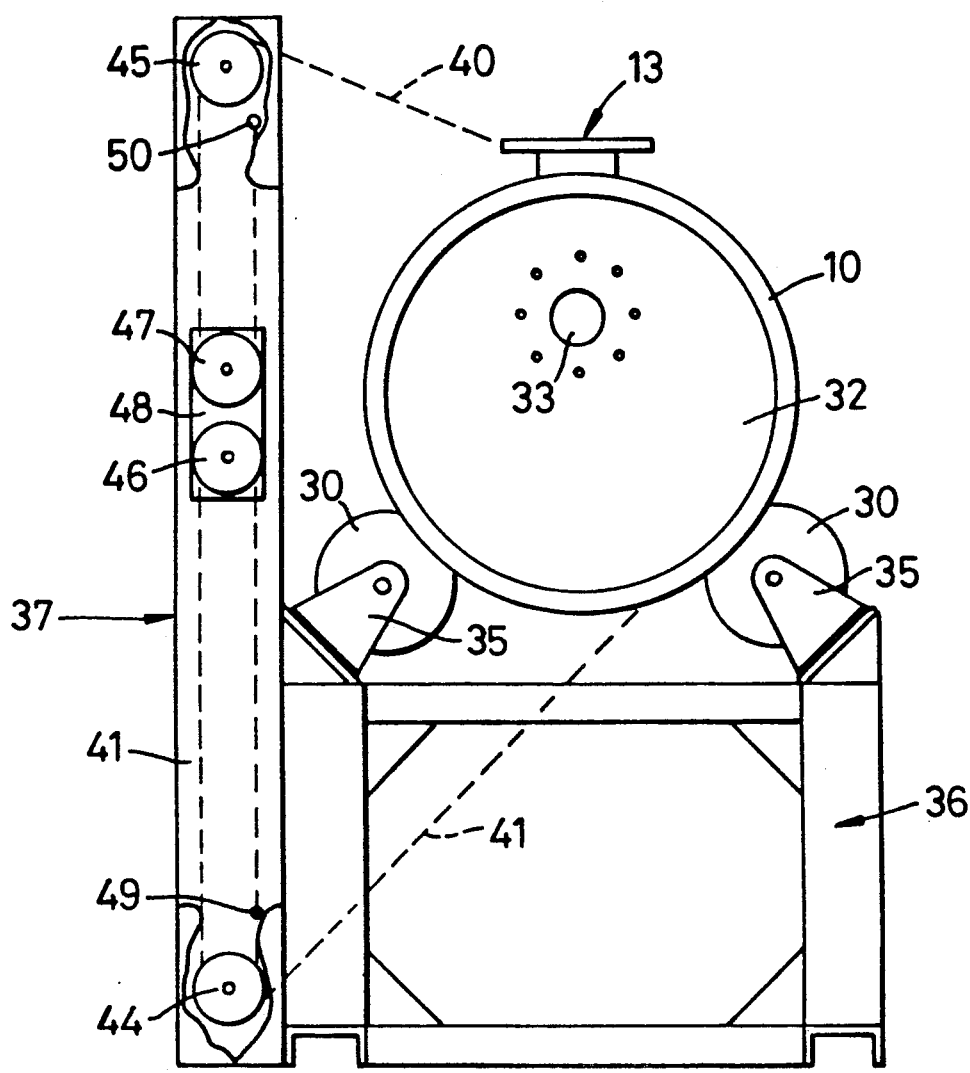
FIG. 1 is a schematic end view of a preferred practical embodiment.
Figure 2:
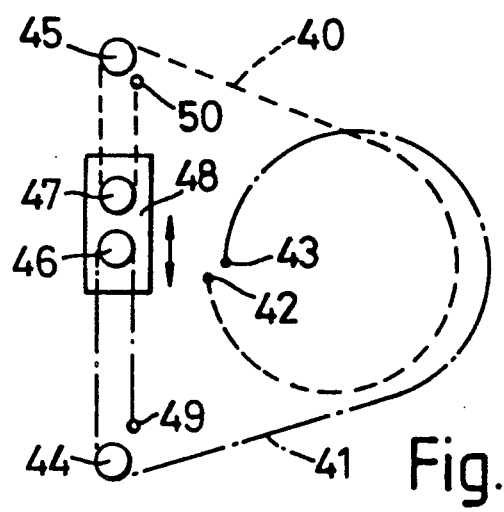
FIG. 2 is a diagrammatic sketch illustrating the means of rotating the housing of the apparatus shown in FIG. 1.
Figure 3:
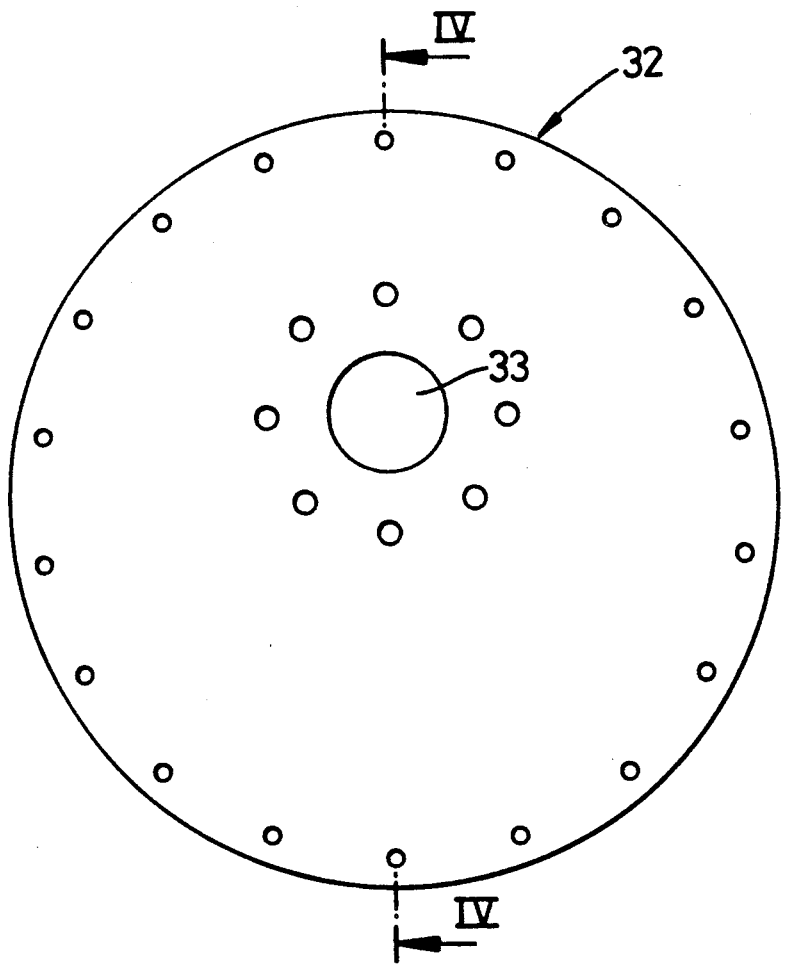
FIG. 3 is an enlarged front view of an end plate of the housing of the apparatus of FIG. 1.
Figure 4:
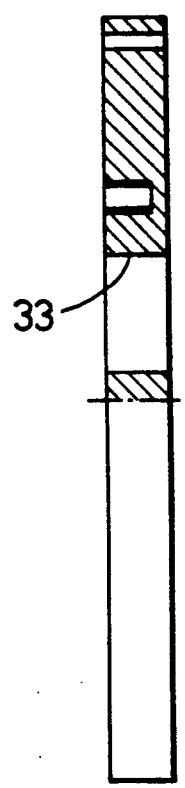
FIG. 4 is a partial cross-section of the end plate of FIG. 3 along the line IV—IV.

The cylindrical housing 10 is externally encircled by three pairs of spaced apart ribs defining tracks 21, 22, 23, which serve as guides for wheels 30 on which the housing 10 is mounted in the fully assembled apparatus (see FIGS. 1 and 5). Between tracks 21 and 22 there is an additional external bend 64 extending only part way around the circumference of the housing. The purpose of this will be explained shortly.

The ends of the housing 10 are closed by respective matching covers 31, 32 (FIGS. 3 and 4), which are peripherally bolted or secured thereon. Each cover 31, 32 is provided with a main port 33 offset from the central axis of the housing 10.

The housing 10 is mounted rotatably upon three pairs of wheels 30 (FIG. 1), each pair engaging in a respective track 21, 22, 23. The wheels 30 themselves are mounted on brackets 35 upon a framework 36 of rectangular form.

A pair of cables 40, 41 are partially wrapped around the housing 10 between the tracks 21 and 22, near the middle of the housing 10. These cables 40, 41 are attached at their ends 42, 43 to closely adjacent points on the external bending 64, which acts to prevent excessive wear on the cables during motion, and thereafter extend in opposite directions around the housing 10 (see FIG. 2 in particular). Each cable 40, 41 then leaves the housing tangentially and is conducted around respective lower and upper rollers 44, 45 which are mounted in fixed position in an adjoining auxiliary frame 37. The cables 40, 41 then extend towards each other and around adjacent rollers 46, 47 mounted on a slide 48, then double back to fixture points 49, 50 on the auxiliary frame 37. The slide 48, is connected to the cable 65 of a cable cylinder 66 which is vertically arranged on the auxiliary frame 37 and is pneumatically or hydraulically operated. The slide 48 is movable between one or more sets of limit switches so that it is reciprocated by alternate strokes of the cylinder 66, resulting in to and fro rotation of the housing 10, by virtue of the cables 40, 41.

In operation the outlet port 14 of the filter area is connected to a flexible hose or rigid pipework via a swivel joint, and thence a vacuum source. Alternatively the ports 33 of the end covers may be connected to a source of pressure medium such as compressed air.

After the housing 10 is filled via ports 11 to 13 (or any one of them) with the suspension to be filtered (represented at 70 in FIG. 6) the vacuum source or pressure source is switched on and the housing 10 is rocked to and fro such that the mid point of the filter means 15 moves between approximately 10 o'clock and 2 o'clock positions. Due to the curved surface of the filter means 15, the cake upon shrinking, has a tendency to reform towards the bottom i.e. the middle effectively "slumping" together, while the rocking motion prevents uneven build up of cake. After filtration, wash sprays (not shown) may be used to wash the cake, whilst still in rocking motion.

If thorough mixing of the cake with another liquor is desirable, an extra set of limit switches may be provided to allow the filter 15 to tumble from, say, the 6 o'clock to the 12 o'clock position, through a 180° arc in each direction.

After a cake has been formed and washed, hot gas can be introduced either through the pressure inlets 33 in the end covers 31, 32 or through the liquor outlet 14. In this manner a bone dry solid can be produced.

To discharge the dried and/or washed filter cake, the housing 10 is rotated so that the filter 15 tumbles through an arc of approximately 150° to discharge through the original inlet ports 11, 12, 13 which are now used as discharge ports.

Of course the foregoing is merely illustrative, not limitative of the invention. Many variations in the details of construction are possible in other embodiments. In particular, the rocking motion can be effected by many different mechanical means, some of which are shown in FIGS. 10 to 16. Also, the housing need not be a cylinder (although that is clearly preferable). Also, further automation is possible, for instance by introducing time control so that the apparatus will filter for a predetermined time, then reslurry, then dry and finally discharge.

Figure 10:
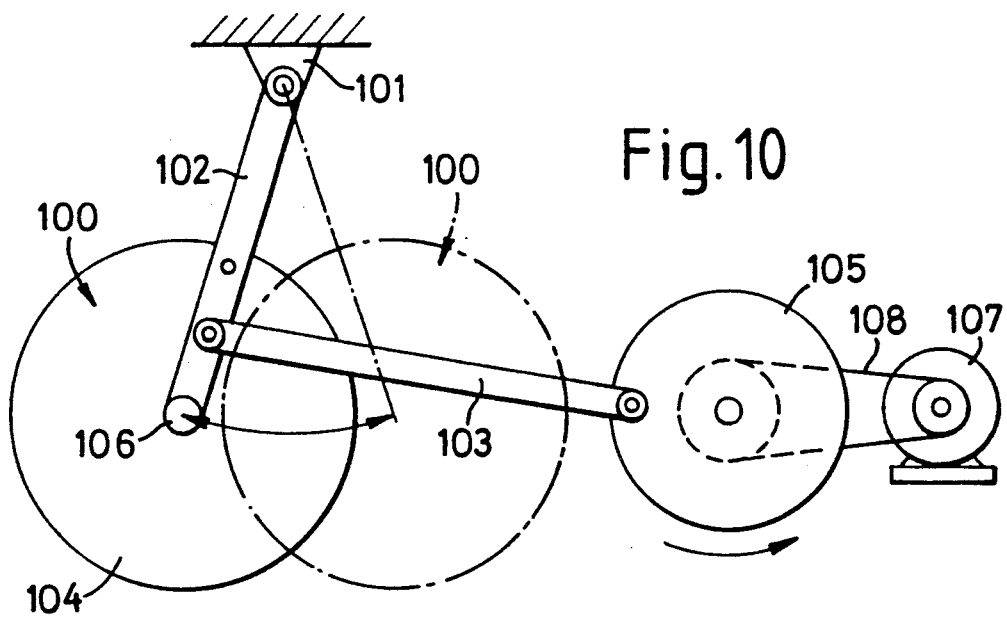
FIG. 10 is a schematic end view of a second practical embodiment in accordance with the invention.

FIG. 10 shows a closed cylindrical filter housing 100, similar to that described in the preceding embodiment, which is swung to and fro on pivotal arms 102 (only one of which is visible) which are connected to axial bearings 106 in the respective end plates 104 of the housing 100 and pivotally suspended from an overhead support 101. Controlled swinging is brought about by a crank lever 103 which is pivotally connected to one of the arms 102 and eccentrically to a drive wheel 105, the latter driven by belt 108 from motor 107. The crank 13 determines the maximum angle of swing of the housing 100, as indicated roughly by the arrows. In this embodiment, discharge of filter cake from the housing could be accomplished by disconnecting the crank 103 at one end and then rotating the housing 100 on its axial bearings. In this embodiment and the following inlet and outlet ports are not shown, for simplicity.

Figure 11:
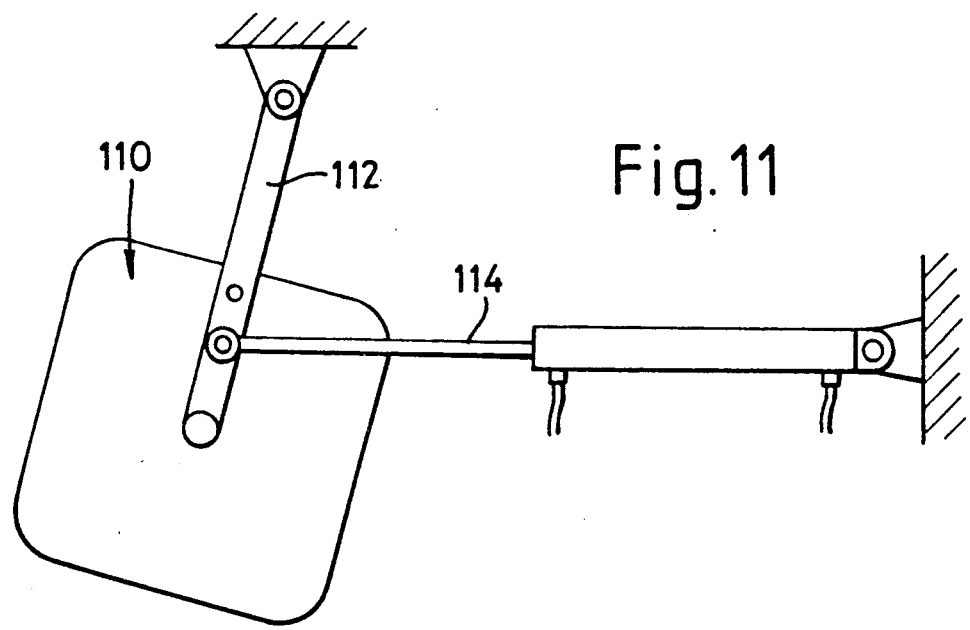
FIG. 11 is a schematic end view of a third embodiment.

FIG. 11 also shows a filter housing 110 which is swingable by pivotal arms 112. In this case, however, the housing 110 is not cylindrical, but has a cross section of approximately square shape with rounded corner regions. The other difference is that the arms 112 are swung by direct pivotal connection to a pivotally mounted double-acting hydraulic or pneumatic ram 114.

Figure 12:
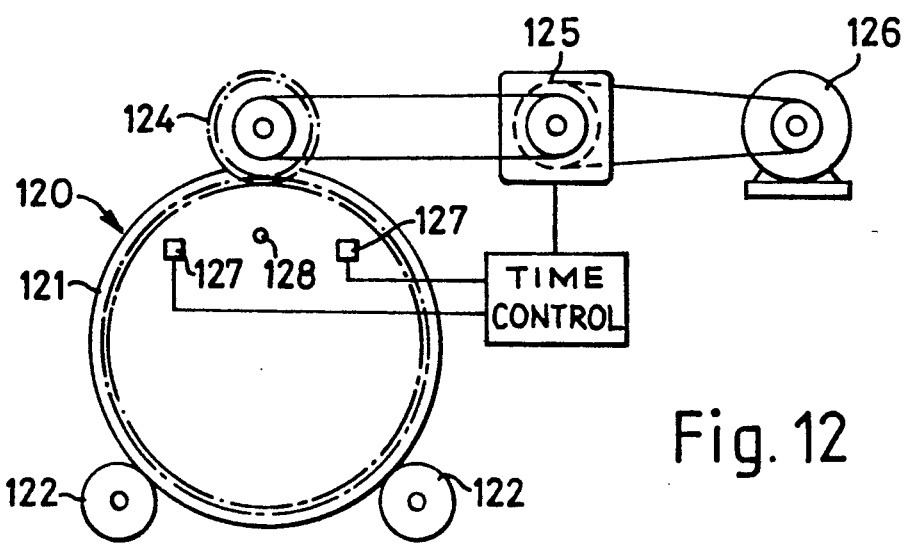
FIG. 12 is a schematic view of a fourth embodiment.

FIG. 12 shows a fundamentally different manner of rocking or rotating a cylindrical housing 120, which is mounted upon rollers 122. In this respect the housing 120 has a toothed track 121 at a location around its circumference and a driven rotary gear 124 meshes with the track 121 to rotate the housing. The gear 124 in this case is driven by belt drives from a motor 126 by way of intermediate reversible gearing 125. Additionally electronic control means for the drive includes limit switches 127, actuable by a stop element 128 on the housing 120 to change the direction of rotation as well as a time control, as mentioned above controlling the time periods for filtering, reslurrying etc. In this respect the limit switches can be overriden to allow the housing 120 to be turned right over to permit discharge.

Figure 13:
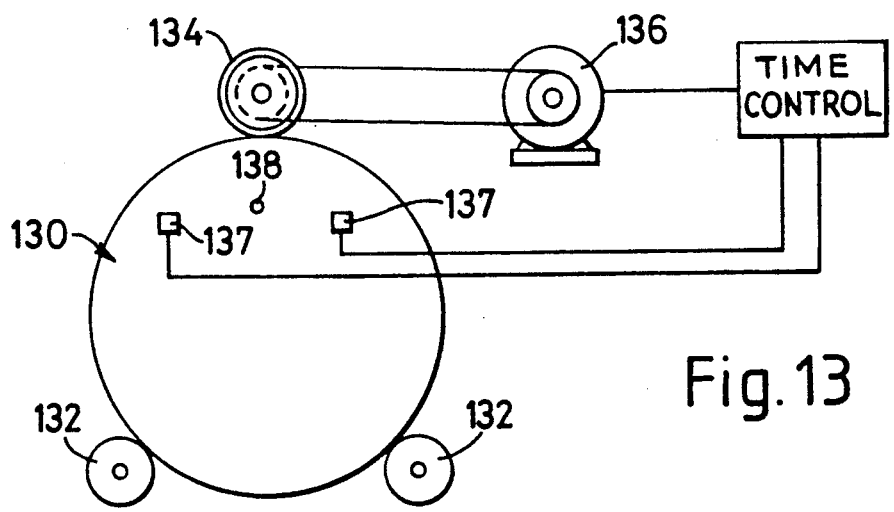
FIG. 13 is a schematic view of a fifth embodiment.

FIG. 13 shows an arrangement similar to FIG. 12 wherein a friction drive wheel 134 acts on the cylindrical housing 130, without any teeth provided for intermeshing, and wherein a reversible motor 136 is employed instead of reversible gearing. In other respects, the arrangement is the same as FIG. 12, with rollers 132, limit switches 137 and a stop 138.

Figure 14:
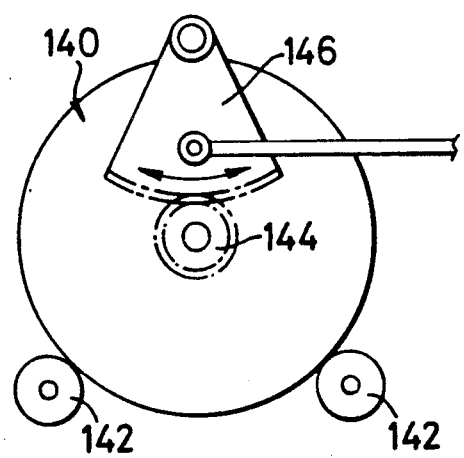
FIG. 14 is a schematic end view of a sixth embodiment.
Figure 15:
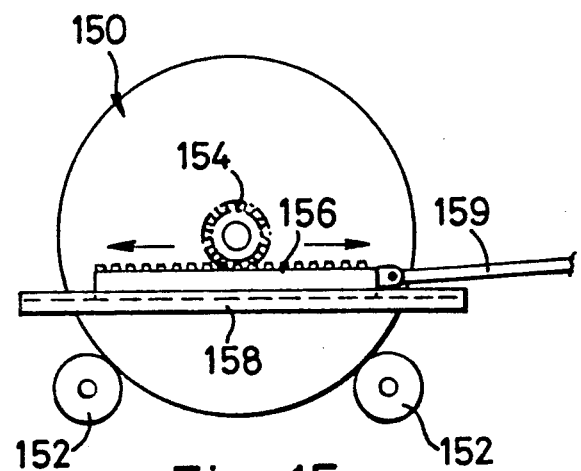
FIG. 15 is a schematic end view of a seventh embodiment.

FIGS. 14 and 15 show ways of rocking a cylindrical housing 140, 150, respectively, mounted on rollers 142, 152, respectively, wherein a toothed pinion 144, 154, respectively, is axially fixed to one of the end plates of the housing. In FIG. 14 the pinion 142 is rotated through a predetermined angle by intermeshing with a quadrant gear 146, which is swung by a crank or by a ram (as in FIGS. 10 or 11). In FIG. 15 the pinion 152 is rotated through a predetermined angle, possibly up to 180° or more, in either direction, by intermeshing with a toothed rack 156, which is displaced longitudinally in a guide 158 by a crank or ram 159.

Figure 16:
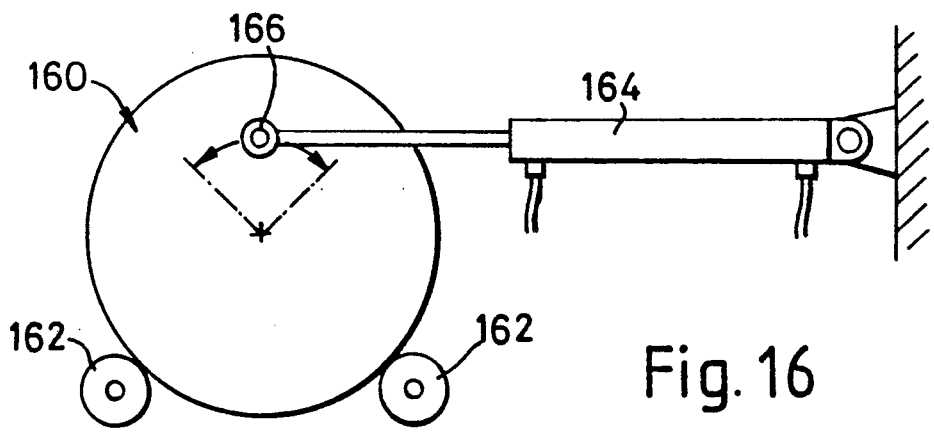
FIG. 16 is a schematic end view of an eighth embodiment.

Finally, FIG. 16 shows how a cylindrical housing 160, again mounted on rollers 162 can be rocked to and fro simply by direct pivotal connection of a double-acting fluid actuated ram 164 to an eccentric bearing point 166 on an end plate of the housing.

I claim:

1. Filtration apparatus comprising a cylindrical filter housing defining a housing interior, inlet means for supplying material to be filtered into said housing interior, outlet means for draining filtrate from said housing interior, curved filter means substantially semicircular in cross section and mounted in said housing interior between said inlet means and said outlet means so as to overlie said outlet means, and means for moving said housing about a longitudinal axis of said housing, wherein the outer cylindrical surface of said housing is mounted upon rollers to permit the movement, said means for moving said housing including cable means attached to said housing, said cable means being attached to a member, means for guiding said member along a rectilinear path, and means for reciprocating said member along said rectilinear path, said reciprocating means comprising either a hydraulic cylinder or a pneumatic cylinder.

2. Filtration apparatus comprising a cylindrical filter housing defining a housing interior, inlet means for supplying material to be filtered into said housing interior, outlet means for draining filtrate from said housing interior, curved filter means substantially semicircular in cross section and mounted in said housing interior between said inlet means and said outlet means so as to overlie said outlet means, and means for moving said housing about a longitudinal axis of said housing, wherein the outer cylindrical surface of said housing is mounted upon rollers to permit the movement, wherein the outer cylindrical surface of said housing includes a toothed track extending around its circumference, and wherein said means for moving said housing includes a rotary gear meshing with said toothed track, and further includes reversible drive means for driving said rotary gear, electronic control means for controlling said drive means, said control means including limit switch means for reversing the direction of motion of said gear, said control means including stop means connected to said housing for actuating said limit switch means at maximum end positions of said housing in respective clockwise and counter-clockwise directions.

3. Filtration apparatus comprising a cylindrical filter housing defining a housing interior, inlet means for supplying material to be filtered into said housing interior, outlet means for draining filtrate from said housing interior, curved filter means substantially semicircular in cross section and mounted in said housing interior between said inlet means and said outlet means so as to overlie said outlet means, and means for moving said housing about a longitudinal axis of said housing, wherein the outer cylindrical surface of said housing is mounted upon rollers to permit the movement, said means for moving said housing including a friction drive wheel impinging upon the outer cylindrical surface of said housing, and further including reversible drive means for driving said friction drive wheel, electronic control means for controlling said drive means, said control means including limit switch means for reversing the direction of motion of said friction drive wheel, said control means including stop means connected to said housing for actuating said limit switch means at maximum end positions of said housing in respective clockwise and counter-clockwise directions.

4. Filtration apparatus comprising a cylindrical filter housing having opposed end walls and defining a housing interior, inlet means for supplying material to be filtered into said housing interior, outlet means for draining filtrate from said housing interior, curved filter means substantially semicircular in cross section and mounted in said housing interior between said inlet means and said outlet means so to overlie said outlet means, and means for moving said housing about a longitudinal axis of said housing, wherein the outer cylindrical surface of said housing is mounted upon rollers to permit the movement, a bearing mounted to at least one of said opposed end walls, said bearing being eccentrically located with respect to the longitudinal axis of said housing, a fixed support means, said means for moving said housing comprising a double acting fluid actuated ram connected pivotally between said bearing and said fixed support means.

5. Filtration apparatus comprising a cylindrical filter housing having opposed end walls and defining a housing interior, inlet means for supplying material to be filtered into said housing interior, outlet means for draining filtrate from said housing interior, curved filter means substantially semicircular in cross section and mounted in said housing interior between said inlet means and said outlet means so as to overlie said outlet means, and means for moving said housing about a longitudinal axis of said housing, wherein the outer cylindrical surface of said housing is mounted upon rollers to permit the movement, said means for moving said housing comprising a pinion axially and fixedly mounted to one of said opposed end walls along the longitudinal axis of said housing, an elongated rack which meshes with said pinion, and means for displacing said rack along a longitudinal axis of said rack.

6. Filtration apparatus comprising a cylindrical filter housing having opposed end walls and defining a housing interior, inlet means for supplying material to be filtered into said housing interior, outlet means for draining filtrate from said housing interior, curved filter means substantially semicircular in cross section and mounted in said housing interior between said inlet means and said outlet means so as to overlie said outlet means, and means for moving said housing about a longitudinal axis of said housing, wherein the outer cylindrical surface of said housing is mounted upon rollers to permit the movement, said means for moving said housing comprising a pinion axially and fixedly mounted to one of said opposed end walls along the longitudinal axis of said housing, a fixed support means, a toothed quadrant which is pivotally mounted to said fixed support means to mesh with said pinion, and means for pivoting said quadrant with respect to said fixed support means.

7. Filtration apparatus comprising a filter housing having a pair of opposed end walls and defining a housing interior, inlet means for supplying material to be filtered into said housing interior, outlet means for draining filtrate from said housing interior, curved filter means mounted in said housing interior between said inlet means and said outlet means so as to overlie said outlet means, fixed support means, and means for moving said housing including a pair of arms pivotally attached respectively at one end thereof to said opposed end walls and pivotally attached respectively at the other end thereof to said fixed support means, and means for swinging said arms with respect to said fixed support means.

8. Apparatus as set forth in claim 7 wherein said means for swinging said arms consists of a double acting fluid actuated ram connected pivotally to one of said arms and to said fixed support means.

9. Apparatus as set forth in claim 7 wherein said means for swinging said arms comprises a crank lever pivotally connected at one end thereof to one of said arms and eccentrically connected at the other end thereof to a drive wheel.

* * * * *